United States Patent
Liu et al.

(10) Patent No.: US 11,823,315 B2
(45) Date of Patent: Nov. 21, 2023

(54) ANIMATION MAKING METHOD AND APPARATUS, COMPUTING DEVICE, AND STORAGE MEDIUM

(71) Applicant: TENCENT TECHNOLOGY (SHENZHEN) COMPANY LTD, Guangdong (CN)

(72) Inventors: Jie Liu, Shenzhen (CN); Jingxiang Li, Shenzhen (CN); Hua Zhang, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 86 days.

(21) Appl. No.: 17/680,921

(22) Filed: Feb. 25, 2022

(65) Prior Publication Data
US 2022/0180586 A1  Jun. 9, 2022

Related U.S. Application Data

(63) Continuation of application No. PCT/CN2020/125924, filed on Nov. 2, 2020.

(30) Foreign Application Priority Data

Feb. 4, 2020 (CN) .......................... 202010080149.0

(51) Int. Cl.
*G06T 13/40* (2011.01)

(52) U.S. Cl.
CPC .................................. *G06T 13/40* (2013.01)

(58) Field of Classification Search
None
See application file for complete search history.

(56) References Cited

U.S. PATENT DOCUMENTS

2014/0072175 A1* 3/2014 Hasler ................ G06T 17/00
  382/103
2017/0316595 A1  11/2017 Noh et al.
(Continued)

FOREIGN PATENT DOCUMENTS

CN  108014497 A  5/2018
CN  108597015 A  9/2018
(Continued)

OTHER PUBLICATIONS

Hasler et al., "A Statistical Model of Human Pose and Body Shape", (Year: 2009).*

(Continued)

*Primary Examiner* — Hilina K Demeter
(74) *Attorney, Agent, or Firm* — Sughrue Mion, PLLC

(57) ABSTRACT

This application belongs to the field of computer technologies, and provides an animation making method and apparatus, a computing device and a storage medium, to improve execution efficiency of animation making. In response to a pose selection instruction for a non-reference skeleton pose, a target plug-in node is invoked, the target plug-in node obtaining a non-reference skeleton shape model corresponding to the non-reference skeleton pose from a non-reference skeleton shape model set based on the pose selection instruction; target skeleton pose for an animated character is determined based on a parameter input instruction for a parameter of the target skeleton pose; and a target skeleton shape model of the target skeleton pose is generated based on the obtained non-reference skeleton shape model of the non-reference skeleton pose.

18 Claims, 7 Drawing Sheets

(56) References Cited

U.S. PATENT DOCUMENTS

| | | | | |
|---|---|---|---|---|
| 2018/0286071 A1* | 10/2018 | Alexander | ............... | G06T 7/62 |
| 2019/0066351 A1* | 2/2019 | Noh | ........................ | G06T 19/20 |
| 2019/0156564 A1* | 5/2019 | Tung | ........................ | G06T 7/50 |
| 2019/0370537 A1* | 12/2019 | Chen | ....................... | G06V 10/34 |
| 2020/0035010 A1* | 1/2020 | Kim | ........................ | G06T 13/40 |
| 2020/0160613 A1* | 5/2020 | Han | ..................... | G06V 40/103 |

FOREIGN PATENT DOCUMENTS

| | | | |
|---|---|---|---|
| CN | 109621419 A | | 4/2019 |
| CN | 110689604 A | | 1/2020 |
| CN | 111260764 A | | 6/2020 |
| KR | 10-2014-0092536 A | | 7/2014 |
| KR | 10-1707203 B1 | | 2/2017 |
| KR | 10-1895331 B1 | | 9/2018 |

OTHER PUBLICATIONS

Shaowei Wang, "Design and Development Based on 3Ds Max Script Three-Dimensional Character Animation and Library Plugin", King King, Full Database Information Technology Series in Chinese Master Thesis, Jan. 15, 2013, pp. 1138-1495.
First Office Action of Chinese Application No. 202010080149.0 dated Apr. 20, 2021.
International Search Report of PCT/CN2020/125924 dated Feb. 4, 2021 [PCT/ISA/210].
Written Opinion of PCT/CN2020/125924 dated Feb. 4, 2021 [PCT/ISA/237].
Korean Office Action dated Aug. 14, 2023 in Korean Application No. 10-2022-7004104.

* cited by examiner

```
                              ┌─ S500
Receive a target skeleton pose parameter inputted for a target
skeleton of an animated character, and determine a target
skeleton pose according to the target skeleton pose parameter ↓ ┌─ S501
Invoke a target plug-in node in response to a pose selection
instruction for a non-reference skeleton pose, and obtain a
non-reference skeleton shape model corresponding to the non-
reference skeleton pose from a non-reference skeleton shape
model set according to the pose selection instruction ↓ ┌─ S502
Generate a target skeleton shape model of the target skeleton
pose based on the obtained non-reference skeleton shape
model of the non-reference skeleton pose
```

FIG. 5

| Non-reference skeleton pose 1 | Disable | | Enable | | Delete |
|---|---|---|---|---|---|
| Non-reference skeleton pose 2 | Disable | | Enable | | Delete |
| Non-reference skeleton pose 3 | Disable | | Enable | | Delete |
| Non-reference skeleton pose 4 | Disable | | Enable | | Delete |
| Non-reference skeleton pose 5 | Disable | | Enable | | Delete |
| Non-reference skeleton pose 6 | Disable | | Enable | | Delete |

FIG. 6

| Non-reference skeleton pose 1 | Disable | | Enable | | Delete |
| --- | --- | --- | --- | --- | --- |
| Non-reference skeleton pose 2 | Disable | | Enable ✓ | | Delete |
| Non-reference skeleton pose 3 | Disable | | Enable ✓ | | Delete |
| Non-reference skeleton pose 4 | Disable | | Enable ✓ | | Delete |
| Non-reference skeleton pose 5 | Disable | | Enable | | Delete |
| Non-reference skeleton pose 6 | Disable | | Enable | | Delete |
FIG. 7
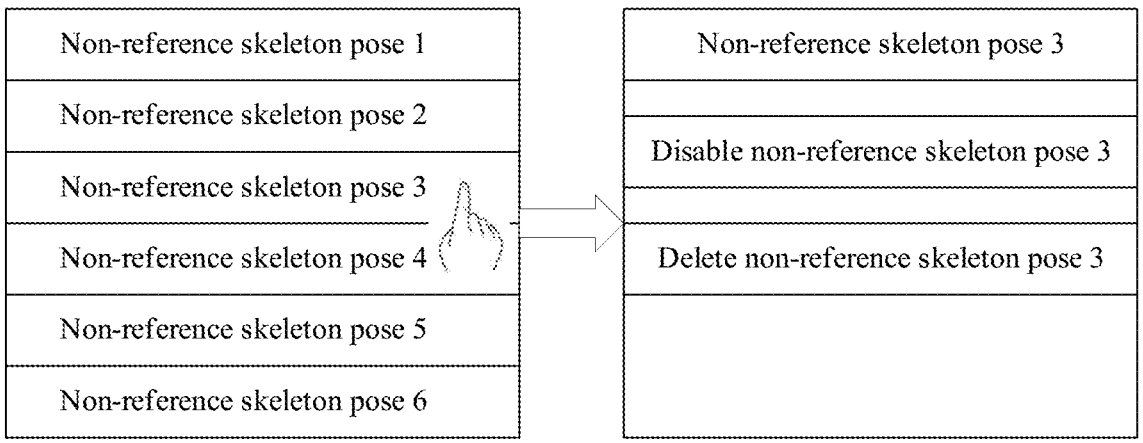
FIG. 8
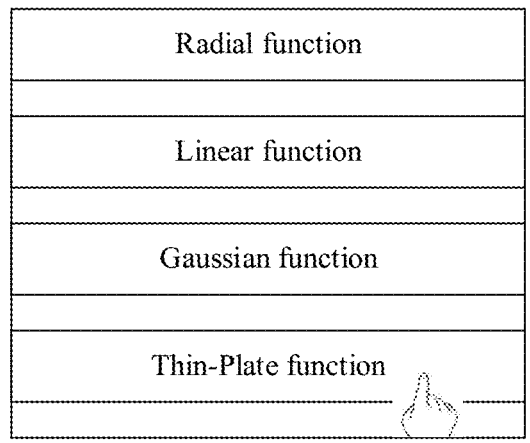
FIG. 9

ANIMATION MAKING METHOD AND APPARATUS, COMPUTING DEVICE, AND STORAGE MEDIUM

CROSS-REFERENCE TO RELATED APPLICATION(S)

This application is a continuation of International Application No. PCT/CN2020/125924, filed Nov. 2, 2020, which claims priority to Chinese Patent Application No. 202010080149.0, filed with the China National Intellectual Property Administration on Feb. 4, 2020, the disclosures of which are incorporated by reference in their entireties.

FIELD

The present disclosure relates to the field of computer technologies, and provides an animation making method and apparatus, a computing device, and a storage medium.

BACKGROUND

Animated characters are widely applied to games and movies. In production of an animated character in a game or a movie, a shape model of the animated character is mainly determined by a skeleton pose of the animated character.

In production of the animated character, a reference skeleton pose and a corresponding shape model of the animated character are first pre-established in animation making software or a game engine. The shape model is analogous to human skin, and the skeleton pose is analogous to a human skeleton. FIG. 1 is a schematic diagram of an arm pose of an animated character. The skeleton pose needs to correspond to the shape model. For example, when an elbow is bent, an upper arm protrudes to simulate muscle protrusion. At the same time, a connecting part between the upper arm and a lower arm is compressed to simulate a squeeze of a real human muscle. FIG. 2 is a schematic diagram of an arm pose of an animated character with a bent elbow. The appearance of the animated character needs to be changed accordingly as the skeleton of the whole body moves, to make the animated character look lifelike.

Currently, each time an animated character is made, some specific skeleton poses need to be made in advance, and all the specific skeleton poses made in advance are used for making the animated character. However, some specific skeleton poses will affect a display effect of the animated character. To avoid any negative effects, only some of the specific skeleton poses will be used for production, and other unused specific skeleton poses will be deleted. In the above-mentioned scheme, the deleted specific skeleton poses need to be remade when used again, resulting in heavy workload and low efficiency of animation production.

SUMMARY

Embodiments of the present disclosure provide an animation making method and apparatus, a computing device, and a storage medium.

According to a first aspect, the present disclosure provides an animation making method, performed by a computing device, the method including:

invoking a target plug-in node in response to a pose selection instruction for a non-reference skeleton pose, and obtaining, based on the pose selection instruction, a non-reference skeleton shape model corresponding to the non-reference skeleton pose from a non-reference skeleton shape model set, where the non-reference skeleton shape model set includes non-reference skeleton shape models corresponding to non-reference skeleton poses; and determining a target skeleton pose according to a parameter input instruction for a target skeleton pose parameter of an animated character, and generating a target skeleton shape model of the target skeleton pose based on the obtained non-reference skeleton shape model corresponding to the non-reference skeleton pose.

According to a second aspect, the present disclosure provides an animation making apparatus, the apparatus including: at least one memory configured to store program code; and at least one processor configured to read the program code and operate as instructed by the program code, the program code comprising:

invoking code configured to cause the at least one processor to invoke a target plug-in node in response to a pose selection instruction for a non-reference skeleton pose, and obtain, based on the pose selection instruction, a non-reference skeleton shape model corresponding to the non-reference skeleton pose from a non-reference skeleton shape model set, where the non-reference skeleton shape model set includes non-reference skeleton shape models corresponding to non-reference skeleton poses; and generating code configured to cause the at least one processor to determine a target skeleton pose according to a parameter input instruction for a target skeleton pose parameter of an animated character, and generate a target skeleton shape model of the target skeleton pose based on the obtained non-reference skeleton shape model corresponding to the non-reference skeleton pose.

According to another aspect, an embodiment of the present disclosure provides a computing device for animation making, including: a memory and a processor, the memory storing computer-readable instructions, the computer-readable instructions, when executed by the processor, causing the processor to perform operations of the animation making method.

According to another aspect, an embodiment of the present disclosure provides one or more non-transitory computer-readable storage medium, storing at least one instruction executable by at least one processor to perform: invoking a target plug-in node in response to a pose selection instruction for a non-reference skeleton pose, the target plug-in node obtaining, based on the pose selection instruction, a non-reference skeleton shape model corresponding to the non-reference skeleton pose from a non-reference skeleton shape model set; and determining a target skeleton pose according to a parameter input instruction for a target skeleton pose parameter of an animated character, and generating a target skeleton shape model of the target skeleton pose based on the obtained non-reference skeleton shape model corresponding to the non-reference skeleton pose.

The present disclosure has the following beneficial effects:

In an animation making method and apparatus, a computing device, and a storage medium of the present disclosure, a target plug-in node is invoked according to a pose selection instruction for a non-reference skeleton pose; a non-reference skeleton shape model corresponding to the non-reference skeleton pose determined according to the pose selection instruction is obtained from a non-reference skeleton shape model set; a target non-reference skeleton shape model is generated based on the obtained non-reference skeleton shape model of the non-reference skeleton pose, where the target skeleton pose is determined according to a parameter input instruction for a target skeleton pose parameter of an animated character. The non-reference skeleton pose of the skeleton shape model for making animation is selected from the plug-in node, improving the application's or game's flexibility when making animated characters. Further, the unselected non-reference skeleton poses will not be deleted and thus do not need to be remade, reducing the amount of computations needed and improving execution efficiency.

Other features and advantages of the present disclosure will be described in the subsequent specification, and partially become apparent from the specification, or be understood by implementing the present disclosure. Objectives and other advantages of the present disclosure may be implemented and obtained by using structures particularly mentioned in the specification, the claims, and the accompanying drawings.

BRIEF DESCRIPTION OF THE DRAWINGS

To describe the technical solutions in the embodiments of the present disclosure more clearly, the accompanying drawings required for describing the embodiments are briefly described hereinafter. Apparently, the accompanying drawings in the following descriptions show merely some embodiments of the present disclosure, and a person of ordinary skill in the art may obtain other accompanying drawings according to these accompanying drawings without creative efforts.

FIG. 5 is a flowchart of an animation making method according to an embodiment of the present disclosure;

FIG. 6 is a display interface for triggering a pose selection instruction according to an embodiment of the present disclosure;

FIG. 7 is a schematic diagram of triggering a pose selection instruction according to an embodiment of the present disclosure;

FIG. 8 is another display interface for triggering a pose selection instruction according to an embodiment of the present disclosure;

FIG. 9 is a display interface of determining a target radial function according to an embodiment of the present disclosure;

DETAILED DESCRIPTION

To make the objectives, technical solutions, and beneficial effects of the present disclosure clearer, the following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

In the following, some terms in the embodiments of the present disclosure are described, so as to help a person skilled in the art have a better understanding.

Animation making software: a general term of software used for making animated characters. The animation making software includes Maya software, Blender software, Houdini software, and the like. The Maya software is three-dimensional (3D) modeling animation software with functions including modeling, animating, rendering and special effects. The Blender software is an open-source cross-platform all-round 3D animation making software, including animation making solutions such as modeling, animation, texture, rendering, audio processing, video editing, and the like. The Houdini software is three-dimensional computer graphics software.

Animated character: a virtual character drawn by a 3D game engine or animation making software with the 3D graphics modeling and rendering technology. The virtual character may be a virtual object with a skeleton pose and a shape pose, such as a virtual human or a virtual animal.

Skeleton animation: each animated character includes at least two types of data: a skeleton pose and a shape pose. In a process of game/film animation making, an animation made by changing the shape pose through the skeleton pose is called a skeleton animation.

Figure 1:
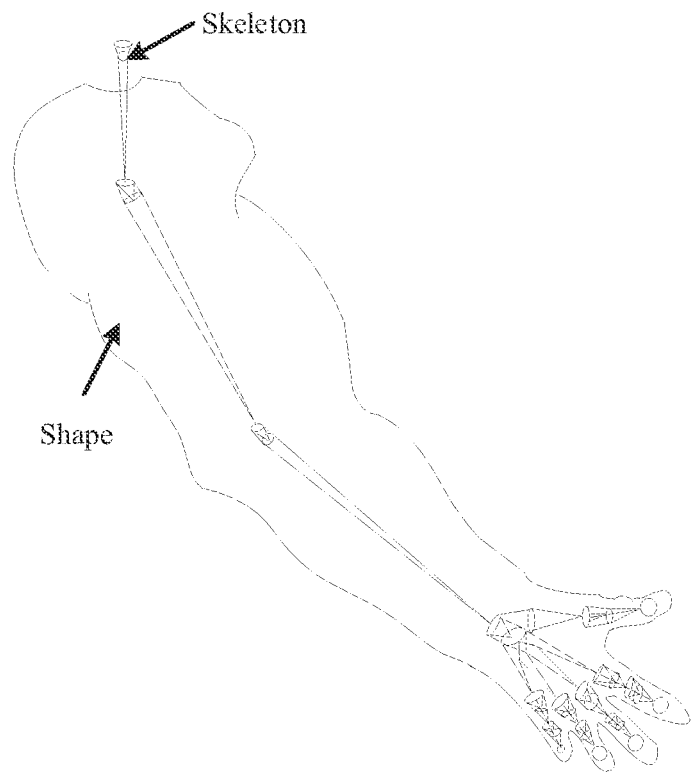
FIG. 1 is a schematic diagram of an arm pose of an animated character.
Figure 2:
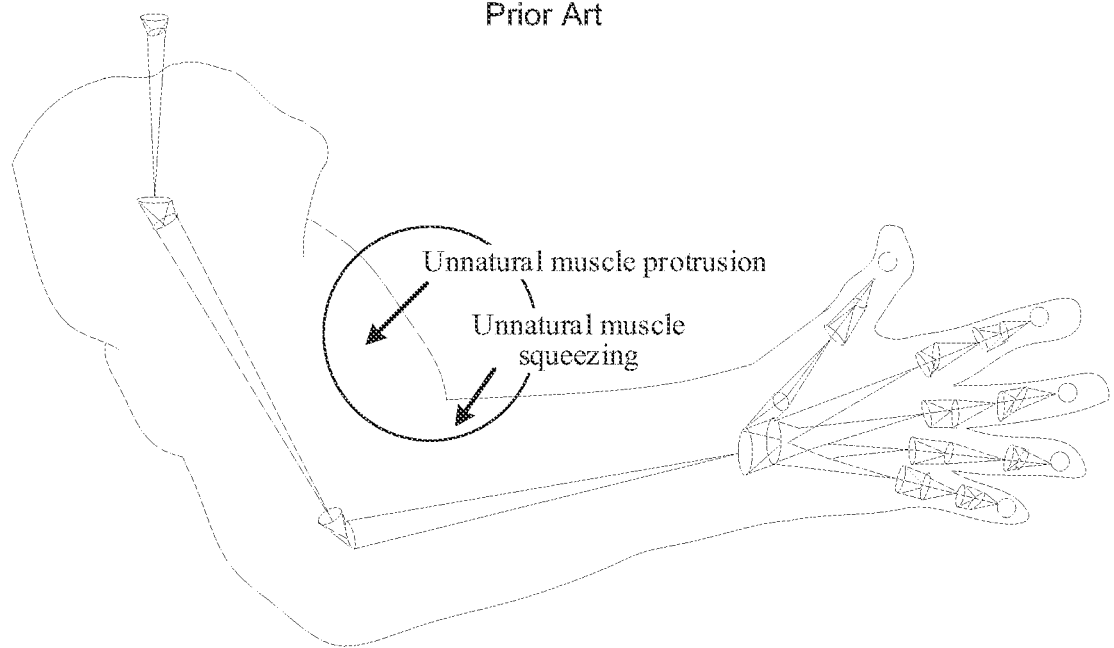
FIG. 2 is a schematic diagram of an arm pose of an animated character with a bent elbow.

Animated character shape Skinning: a shape of an animated character changes with skeleton poses. Therefore, it is necessary to define a skeleton and define that the skeleton can drive vertexes on a shape model. A process of Skinning is to specify all driving relationship between the skeleton and the vertexes of the shape model. When the skeleton pose changes, the vertexes of the shape model also change. That is, the shape model of the animated character changes. As shown in FIG. 1, assuming that the skeleton pose and the shape model shown in FIG. 1 are in an initial pose, when the skeleton pose changes from the pose of FIG. 1 to a pose of FIG. 2, the shape model also changes correspondingly, that is, from the shape model in FIG. 1 to a shape model in FIG. 2. The skeleton drives the vertexes of the shape model, causing the shape model to change with a change in the skeleton pose.

RBF (Radial Basis Function) algorithm: an algorithm that can perform mathematical interpolation among a set of states to obtain a new state.

PoseDriver method: a scheme that uses the RBF algorithm to read a skeleton pose of an animated character to obtain a new character shape.

BlendShape: a shape blending deformer, which is a data storage form recording data of a shape model of an animated character.

Modeler: a producer who determines a driving relationship between a skeleton pose and a shape model. The modeler establishes a correspondence or mapping between the skeleton pose of the animated character and the shape model of the animated character, and enables, when the skeleton pose changes, the shape model of the animated character to change correspondingly through the Skinning process.

The following briefly describes a design idea of the embodiments of the present disclosure.

An animated character, mainly a skeleton animation of an animated character, is made through animation making software or a game engine. One method is using a Pose-Driver method to deform a shape model of the animated character, to obtain a new shape model. In this embodiment, production of an animated character through the animation making software Maya is used as an example:

Surface deformation refers to a process in which the shape model changes with a skeleton pose. During the surface deformation, a change is made by using the driving relationship specified by Skinning, causing the shape model will have only a basic change, that is, with the shape model will reflect a poor effect of the change. To achieve a better visual effect, and to achieve an effect of customizing by the modeler based on experience, on the basis of Skinning, PoseDriver is used for making a change to obtain a new shape model.

In the PoseDriver process, the modeler is required to predefine the shape model of the skeleton in different poses. Taking an upper arm skeleton as an example, 5 reference skeleton poses are usually defined: the upper arm is level, the upper arm is forward, the upper arm is upward, the upper arm is downward, and the upper arm is backward. In some embodiments, more or less skeleton poses may be defined.

Figure 3:
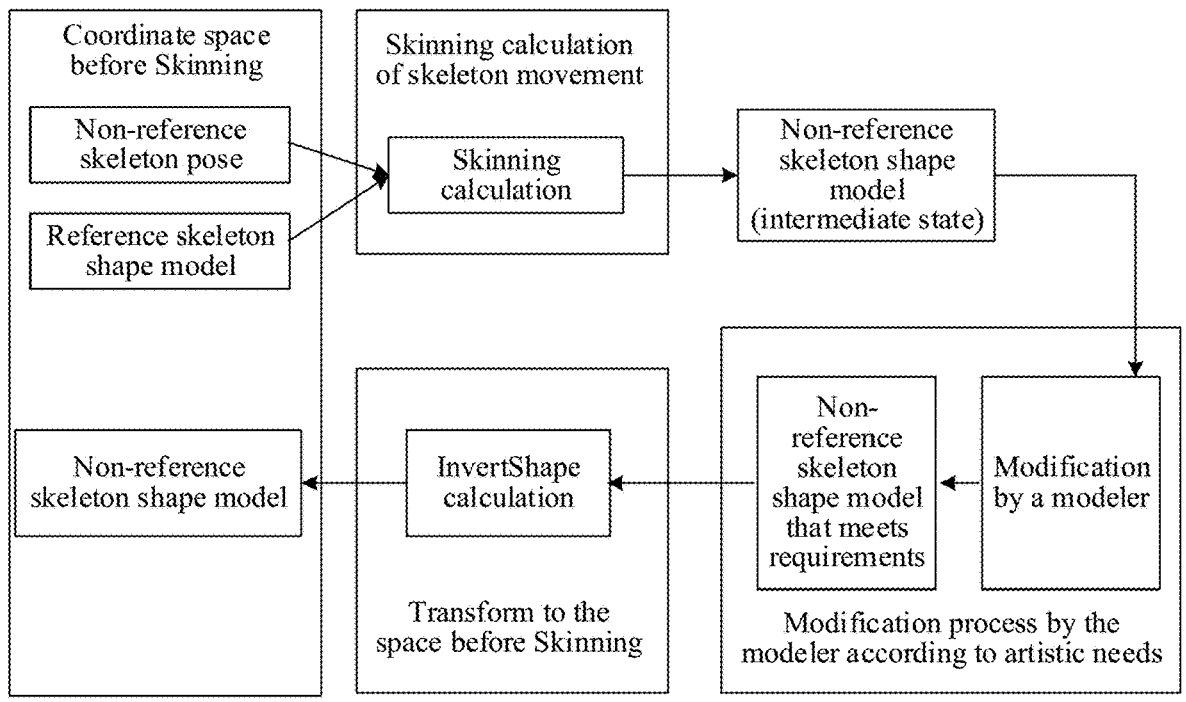
FIG. 3 is a schematic diagram of generating a shape model corresponding to a non-reference skeleton pose in the related art.

When making a shape model corresponding to a non-reference skeleton pose, the modeler uses the predefined 5 reference skeleton poses and corresponding reference skeleton shape models, and completes production in the animation making software. In the process, by using the non-reference skeleton pose and the reference skeleton shape model corresponding to the reference skeleton pose, the Skinning process is used for determining the non-reference skeleton shape model corresponding to the non-reference skeleton pose. Then, if the modeler believes that the current non-reference skeleton shape model cannot meet requirements, the modeler will modify the non-reference skeleton shape model corresponding to the non-reference skeleton pose as required, to obtain the non-reference skeleton shape model that meets the requirements. Once the non-reference skeleton shape model that meets the requirements is obtained, the non-reference skeleton shape model is transformed, after a reverse coordinate space conversion, to a coordinate system before the Skinning process. This process can be called InvertShape calculation. A model obtained after the InvertShape calculation and the shape models corresponding to the reference skeleton poses are unified under the same coordinate system. FIG. 3 is a schematic diagram of generating a non-reference skeleton shape model corresponding to a non-reference skeleton pose. In the field of animation making, non-reference skeleton poses are generally called specific skeleton poses to be distinguished from reference skeleton poses. Correspondingly, shape models corresponding to the non-reference skeleton poses are called specific skeleton shape models.

After the non-reference skeleton poses and the corresponding non-reference skeleton shape models are generated, a shape model corresponding to any new skeleton pose can be determined by using the generated non-reference skeleton poses and the corresponding non-reference skeleton shape models.

According to embodiments, the upper arm skeleton of the animated character may be used to determine a shape model corresponding to a new skeleton pose. More specifically, in embodiments:

a non-reference skeleton pose is generally defined by some parameters, such as an action instruction parameter, a skeleton bending angle parameter, and the like. These parameters are collectively referred to as skeleton pose parameters. According to inputted skeleton pose parameters, a target skeleton pose that needs to be generated can be determined. During animation making, when an input parameter for the animated character is received, the upper arm skeleton of the animated character first moves to generate a new target skeleton pose; then, based on the non-reference skeleton shape models corresponding to the non-reference skeleton poses, a shape model corresponding to the new target skeleton pose is generated.

Currently, it is impossible to disable a pre-generated non-reference skeleton pose during a process of generating the shape model for the new target skeleton pose. If a non-reference skeleton pose is disabled, it is necessary to delete the disabled non-reference skeleton pose and the corresponding non-reference skeleton shape model. Therefore, presently, even though the non-reference skeleton poses cannot be retained, to disable a non-reference skeleton pose, it is necessary to delete the non-reference skeleton pose and the corresponding non-reference skeleton shape model. Thus, if the deleted non-reference skeleton pose needs to be used again, it is necessary to remake the non-reference skeleton shape model corresponding to the non-reference skeleton pose. Deleting and remaking the non-reference skeleton shape model requires a relatively heavy workload, reduces speed of processing, and affects the efficiency of making animation characters.

Advantageously, if a non-reference skeleton pose to be disabled is not deleted, when the corresponding shape model is generated based on the new skeleton pose, all non-reference skeleton poses and corresponding non-reference skeleton shape models will be used, improving the naturalness of the shape model corresponding to the new skeleton pose. However, using all non-reference skeleton poses to generate the corresponding shape model requires heavy computing and affects the speed and efficiency of making animated characters.

In view of the above-mentioned problems, embodiments of the present disclosure provide an animation making method and apparatus, a computing device and a storage medium. The embodiments of the present disclosure relate to artificial intelligence (AI) and machine learning technologies, and are designed based on the computer vision (CV) technology and machine learning (ML) of AI.

AI involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making. The AI technology mainly includes several major directions such as a computer vision technology, a speech processing technology, machine learning/deep learning, and the like.

With the research and progress of the AI technology, AI is studied and applied in a plurality of fields such as common smart home, image retrieval, video surveillance, smart speaker, smart marketing, unmanned driving, automatic driving, unmanned aerial vehicle, robot, smart medical care, and the like. It is believed that with the development of technologies, AI will be applied to more fields, and play an increasingly important role.

The computer vision technology is an important application of AI. The computer vision technology studies related theories and technologies, trying to establish an AI system that can obtain information from a picture, a video or multi-dimensional data to replace human visual interpretation. A typical computer vision technology usually includes image processing and video analysis. The animation making method provided by the embodiments of the present disclosure relates to image processing.

ML is a multi-field interdisciplinary subject involving the probability theory, statistics, the approximation theory, convex analysis, the algorithm complexity theory, and the like. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and the like. The embodiments of the present disclosure use a scheme of making a skeleton animation of an animated character based on the RBF algorithm and the PoseDriver method in an animation making process.

In an animation making method provided by the present disclosure, to retain an unselected non-reference skeleton shape model, a plug-in technology is used for storing all the non-reference skeleton shape models outside animation production software, to form a non-reference skeleton shape model set. Each time an animation is made, a plug-in is used for invoking a shape model of a selected non-reference skeleton pose from the non-reference skeleton shape model set, to make a shape model of a target skeleton pose. Therefore, it is unnecessary to delete the shape model of the unselected non-reference skeleton pose. In the animation making method provided by the present disclosure, each time an animation is made, a target plug-in node is invoked in response to a pose selection instruction for a non-reference skeleton pose; a selected non-reference skeleton shape model is obtained from a non-reference skeleton shape model set according to the pose selection instruction for the non-reference skeleton pose, where the non-reference skeleton shape model set includes non-reference skeleton shape models corresponding to non-reference skeleton poses; and after the non-reference skeleton shape model is obtained, a target skeleton shape model of a target skeleton pose is generated based on the obtained non-reference skeleton shape model, where the target shape model of the target skeleton pose is determined according to a parameter input instruction for a target skeleton pose parameter of an animated character.

In the present disclosure, the target plug-in node is invoked, and according to the pose selection instruction, a non-reference skeleton shape model corresponding to a non-reference skeleton pose is obtained from the non-reference skeleton shape model set. The target skeleton shape model of the target skeleton pose is generated based on the obtained non-reference skeleton shape model. A non-reference skeleton shape model used for making an animated character can be selected based on actual requirements of the system, the animated character, or custom preferences of the user, improving flexibility and providing customization in the process of making an animated character. A more natural shape model can be generated according to the selected non-reference skeleton shape model, and it is unnecessary to use an unselected non-reference skeleton shape model to generate a target skeleton shape model, thereby reducing the amount of calculation and improving execution efficiency.

In addition, the present disclosure uses the plug-in to store the non-reference skeleton shape model set. In animation making, at least one non-reference skeleton shape model is obtained from the non-reference skeleton shape model set and used. Unused non-reference skeleton shape models are still stored in the non-reference skeleton shape model set without being deleted. Therefore, there is no need to remake the non-reference skeleton shape models, thereby reducing a workload and improving execution efficiency.

In an example embodiment, when the target skeleton shape model of the target skeleton pose is generated based on the obtained non-reference skeleton shape model of the non-reference skeleton pose, at least two non-reference skeleton poses and the corresponding non-reference skeleton shape models can be obtained. For any non-reference skeleton pose, a vector distance between the non-reference skeleton pose and the target skeleton pose is determined. Based on a target radial function of RBF, the vector distances corresponding to the obtained non-reference skeleton poses are respectively transformed to a radial function space, where the target radial function is selected from preset radial functions according to a function selection instruction. Linear mapping is performed on each vector distance in the radial function space, and a weight of the non-reference skeleton pose corresponding to the each vector distance is determined. A weighted sum of the non-reference skeleton shape models corresponding to the non-reference skeleton poses is calculated by using the weights of the non-reference skeleton poses, to generate the target skeleton shape model of the target skeleton pose. The target radial function includes: $f(d)=d^2 \times \log d/k$, where d is a vector distance and k is a constant. The target skeleton shape model generated by using $f(d)=d^2 \times \log d/k$ as the target radial function has a more natural visual effect.

After the description of the design idea of the embodiments of the present disclosure, the following briefly describes an application scenario to which the present disclosure is applied. The scenario described below is merely used for describing rather than limiting the embodiments of the present disclosure. During specific implementation, the technical solutions provided in the embodiments of the present disclosure may be flexibly applied according to an actual requirement.

Figure 4:
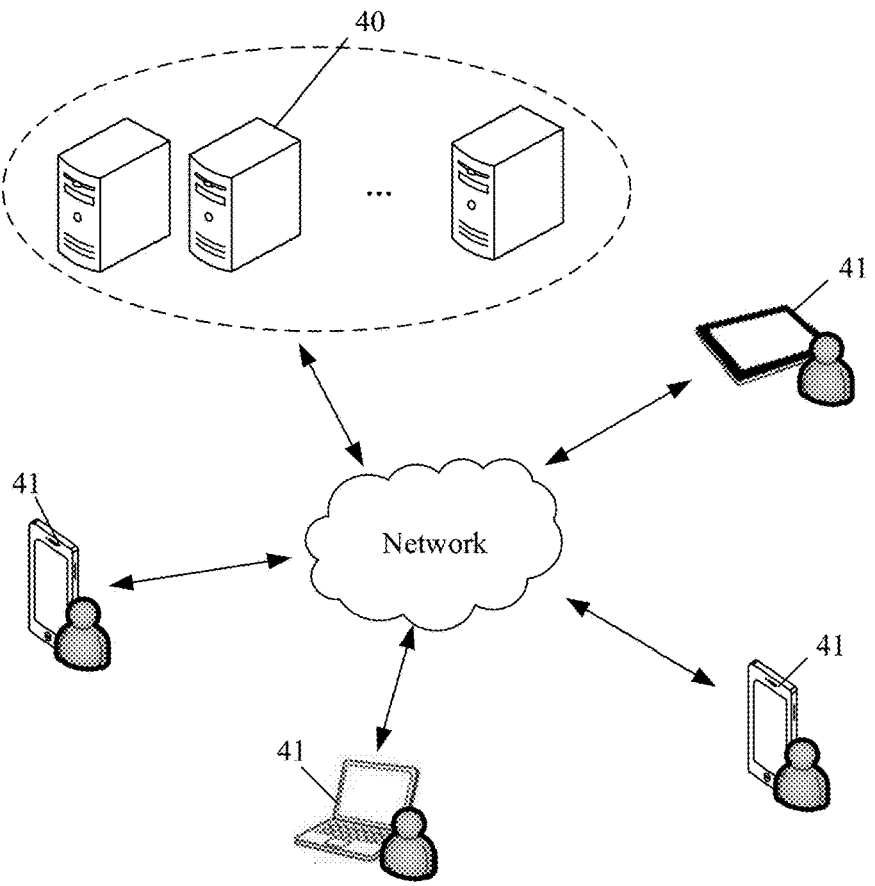
FIG. 4 is a schematic diagram of an application scenario of animation making according to an embodiment of the present disclosure.

FIG. 4 is a diagram of an example network for making an animated character or implementing an animation making method according to an embodiment of the present disclosure. A server 40 communicates, through a network, with a plurality of terminal devices 41 installed with animation making software or game engines, where the network may be, but is not limited to, a local area network, a metropolitan area network, or a wide area network. The terminal device 41 may be a personal computer (PC), a tablet computer, a personal digital assistant (PDA), a notebook computer, a mobile phone, or other terminal devices. The terminal device may alternatively be a computer having a mobile terminal, including a portable, pocket-sized, handheld, computer built-in, or in-vehicle mobile apparatus, which can provide voice, data or voice and data connectivity device for a user, and exchange voice, data or voice and data with a radio access network. The server 40 can be any background running device that can provide Internet services for managing stored data.

In an example implementation scenario, the terminal device 41 is used for installing animation making software or a game engine, and display various operation interfaces of the animation making software or the game engine through a display screen of the terminal device 41. The terminal device 41 receives, through the operation interfaces, various operation instructions triggered by a user, transmits the operation instructions to the server 40, to cause the server 40 to make an animated character in response to various operation instructions, and to display a produced animated character on the display screen of the terminal device 41.

In an example implementation, in order to reduce communication delay, servers 40 may be deployed in various regions, or for load balancing, different servers 40 may respectively serve making animated character making processes corresponding to different terminal devices 41. A plurality of servers 40 can share data through a blockchain, and the plurality of servers 40 are equivalent to a data sharing system including the plurality of servers 40. For example, the terminal device 41 is located at location a and communicates with the server 40. The terminal device 41 is located at location b, and communicates with another server 40.

Each server 40 in the data sharing system has a node identifier corresponding to the server 40, and each server 40 in the data sharing system may store node identifiers of other servers 40 in the data sharing system, to broadcast a generated block to the other servers 40 in the data sharing system according to the node identifiers of the other servers 40 subsequently. Each server 40 may maintain a node identifier list shown in the following table, and names of the servers 40 and the node identifiers are stored in the node identifier list correspondingly. The node identifier may be an internet protocol (IP) address and any other type of information that can be used for identifying the node. Table 1 only uses the IP address as an example for description.

TABLE 1

| Name of a backend server | Node identifier |
| --- | --- |
| Node 1 | 119.115.151.174 |
| Node 2 | 118.116.189.145 |
| . . . | . . . |
| Node 3 | 119.124.789.258 |

In the present disclosure, the terminal device 41 determines a pose selected by the modeler and reports the selected pose to the server 40. The server 40 responds to a pose selection instruction and invokes a target plug-in node according to the pose selection instruction. The target plug-in node obtains, according to the pose selection instruction, a non-reference skeleton shape model corresponding to a non-reference skeleton pose from a non-reference skeleton shape model set. The terminal device 41 receives a parameter input from the modeler for a target skeleton pose parameter of an animated character, and reports the inputted parameter to the server 40. The server 40 determines a target skeleton pose according to the inputted parameter, and generates a target skeleton shape model of the target skeleton pose based on the target skeleton pose, the non-reference skeleton pose and the non-reference skeleton shape model.

Based on the example implementations discussed in FIG. 4, the following describes a method for making an animated character or an animation making method provided by the embodiments of the present disclosure.

Upon reception of the target skeleton pose parameter inputted for the target skeleton, it is determined that the skeleton pose of the animated character has changed, and it is necessary to make a target skeleton shape model corresponding to the target skeleton pose of the animated character.

During making of the skeleton shape model of the animated character, the skeleton shape model of the animated character is changed according to the skeleton pose of the animated character, to cause a surface deformation of the animated character. For a skeleton, skeleton shape models of the skeleton in different poses are pre-established. When the skeleton moves to generate a new skeleton pose, a skeleton shape model corresponding to the new skeleton pose is generated according to a correspondence or mapping between the pre-established skeleton poses and skeleton shape models of the skeleton. However, using all the pre-established skeleton poses and skeleton shape models requires large amounts of computations with low execution efficiency. Further not all the pre-established skeleton poses and skeleton shape models meet requirements for making the animated character, resulting in unnatural shape models of the skeleton poses of the animated character, thus negatively affecting the animation visuals. A disadvantage of related art is that to disable a skeleton pose and a corresponding skeleton shape model, it is necessary to delete the skeleton pose and the corresponding skeleton shape model. Then, to use the skeleton pose and the corresponding skeleton shape model later, the user needs to remake the skeleton pose and the corresponding skeleton shape model, which wastes animation production time, and further reduces execution efficiency.

Therefore, in the embodiments of the present disclosure, when skeleton shape models of the animated character are made, a disable function or an enable function is set for each pre-established skeleton pose and the corresponding skeleton shape model; a non-reference skeleton pose and a corresponding non-reference skeleton shape model to be used for making the target skeleton shape model of the target skeleton pose are then selected according to actual requirements. The target skeleton shape model of the target skeleton pose of the animated character is generated according to the non-reference skeleton pose and the corresponding non-reference skeleton shape model.

FIG. 5 is a flowchart of an animation making method according to an embodiment of the present disclosure, including the following operations:

Operation 500: Receive a target skeleton pose parameter inputted for a target skeleton of an animated character, and determine a target skeleton pose according to the target skeleton pose parameter.

The target skeleton pose parameter is target skeleton position information. Taking an arm of the animated character as an example, the target skeleton pose parameter may be the arm with a 30° bend. In this example, an angle between an upper arm and a lower arm is 30°, and a state of the upper arm and the lower arm forming a 30° angle is the target skeleton pose. The target skeleton pose parameter may alternatively be inputted motion information, such as jumping, and various skeleton poses of the animated character in a jumping state can be determined. For example, each skeleton pose of the animated character in the jumping state can be preset.

In the present disclosure, after the target skeleton pose of the animated character is determined, a target skeleton shape model in the target skeleton pose needs to be determined.

Since the target skeleton shape model is generated based on blending of preset non-reference skeleton shape models, it is necessary to determine a plurality of non-reference skeleton shape models. The plurality of non-reference skeleton shape models can generate the target skeleton shape model, and can make the generated target skeleton shape model have a natural curve and a good visual effect.

Thus, it is necessary to select, from a non-reference skeleton shape model set stored in the plug-in node, at least one non-reference skeleton shape model corresponding to at least one non-reference skeleton pose, and create the target skeleton shape model corresponding to the target skeleton pose according to the selected non-reference skeleton shape model, where the non-reference skeleton pose may be determined according to a pose selection instruction.

The above-mentioned process may need to be practiced many times until the generated target skeleton shape model has a natural curve and meets requirements such as the visual effect. Then the non-reference skeleton poses used when the requirements are met are packaged and stored for use in a game.

Obtaining the non-reference skeleton shape model from the non-reference skeleton shape model set stored in a plug-in node is performed after the pose selection instruction for the non-reference skeleton pose is received.

Operation 501: Invoke a target plug-in node in response to a pose selection instruction for a non-reference skeleton pose, and obtain a non-reference skeleton shape model corresponding to the non-reference skeleton pose from a non-reference skeleton shape model set according to the pose selection instruction.

In the present disclosure, for a skeleton, a plurality of reference skeleton poses and corresponding reference skeleton shape models are pre-established and stored.

Further, according to the pre-established reference skeleton poses and corresponding reference skeleton shape models, non-reference skeleton shape models corresponding to non-reference skeleton poses are generated, and the generated non-reference skeleton shape models corresponding to the non-reference skeleton poses are stored in the non-reference skeleton shape model set of the plug-in node, for use in making a target skeleton shape model.

When the non-reference skeleton shape models are stored, the non-reference skeleton poses need to be stored correspondingly, and for each skeleton, a plurality of non-reference skeleton poses and corresponding non-reference skeleton shape models are stored in advance, so as to determine, according to a pose selection instruction, a non-reference skeleton shape model corresponding to a non-reference skeleton pose included in the pose selection instruction.

In the present disclosure, the pose selection instruction is manually triggered on a display interface. FIG. 6 shows a display interface for triggering a pose selection instruction according to an embodiment of the present disclosure. It can be seen from FIG. 6 that a plurality of non-reference skeleton pose parameters are displayed on the display interface. Each non-reference skeleton pose parameter is correspondingly provided with a disable function or an enable function, and each non-reference skeleton pose parameter corresponds to a non-reference skeleton pose.

When the pose selection instruction for a non-reference skeleton pose is triggered, a non-reference skeleton pose may be disabled, or a non-reference skeleton pose may be used. For example, if a non-reference skeleton pose is used, the enable function corresponding to the non-reference skeleton pose to be used is checked. FIG. 7 is a schematic diagram of triggering a pose selection instruction according to an embodiment of the present disclosure.

In the present disclosure, when the disable function of a non-reference skeleton pose is checked, the pose selection instruction is used for instructing to disable the skeleton pose. Then, the target plug-in node is invoked. When obtaining the non-reference skeleton shape model corresponding to the non-reference skeleton pose from the non-reference skeleton shape model set according to the pose selection instruction, the target plug-in obtains, from the non-reference skeleton shape model set, a non-reference skeleton shape model corresponding to an unselected non-reference skeleton pose or a non-reference skeleton pose that is not instructed to be disabled.

When the enable function of a non-reference skeleton pose is checked, the pose selection instruction is used for instructing to enable the skeleton pose. Then, the target plug-in node is invoked. When obtaining the non-reference skeleton shape model corresponding to the non-reference skeleton pose from the non-reference skeleton shape model set according to the pose selection instruction, the target plug-in node obtains a non-reference skeleton shape model corresponding to the selected non-reference skeleton pose or the non-reference skeleton pose that is instructed to be enabled.

In an example embodiment, a deleting function is further set for the non-reference skeleton poses displayed on the display interface. When a pose deletion instruction is received, a non-reference skeleton pose corresponding to the delete instruction is deleted in response to the pose deletion instruction, and a non-reference skeleton shape model that is corresponding to the deleted non-reference skeleton pose and stored in the non-reference skeleton shape model set is deleted.

The deleting function may be implemented by setting a deleting button for each non-reference skeleton pose, as shown in FIG. 6. Alternatively, a deleting area may be set for each non-reference skeleton pose. Alternatively, only one deleting area is set, where the deleting area is valid for all the non-reference skeleton poses, and when the deleting area is used, a non-reference skeleton pose to be deleted is dragged to the deleting area for deleting.

In an example implementation, the non-reference skeleton shape models can be displayed on the display interface, and functions such as disabling and/or enabling, and deleting can be set, which is the same as FIG. 6 and will not be repeated here.

In an example implementation, only non-reference skeleton poses and/or non-reference skeleton shape models are set on the display interface, and functions such as disabling, enabling, or deleting are not set. When a non-reference skeleton pose and/or a non-reference skeleton shape model is clicked, a function interface is redirected to, where the function interface includes functions such as disabling, enabling, deleting, and the like. FIG. 8 shows another display interface for triggering a pose selection instruction according to an embodiment of the present disclosure.

In the present disclosure, the disable/enable function and the deleting function are separated. Therefore, when a skeleton pose is disabled, the skeleton shape model corresponding to the disabled skeleton pose is merely not used during making of an animated skeleton shape model, but will not be deleted. Therefore, during making of a target skeleton shape model of a target skeleton pose next time, the skeleton shape model corresponding to the disabled skeleton pose can still be used without being remade, thereby eliminating calculations relating to the recreation of the disabled skeleton pose and improving execution efficiency.

After the non-reference skeleton shape model of the non-reference skeleton pose is obtained, based on the obtained non-reference skeleton shape model of the non-reference skeleton pose, the target skeleton shape model of the target skeleton pose is generated, where the target skeleton pose is the target skeleton pose determined according to the parameter input instruction for the target skeleton pose parameter of the animated character in operation 500

Operation 502: Generate a target skeleton shape model of the target skeleton pose based on the obtained non-reference skeleton shape model of the non-reference skeleton pose.

In the present disclosure, the non-reference skeleton pose and the corresponding non-reference skeleton shape model have been determined according to the pose selection instruction for the non-reference skeleton pose; and the target skeleton pose has been determined according to the parameter input instruction for the target skeleton pose parameter of the animated character.

Therefore, in the process of generating the target skeleton shape model of the target skeleton pose, the target skeleton shape model is generated by using the non-reference skeleton pose, the non-reference skeleton shape model, and the target skeleton pose.

In an example implementation, based on an RBF algorithm, the target skeleton shape model is generated based on the above-mentioned three parameters.

When at least two non-reference skeleton poses are obtained, non-reference skeleton shape models corresponding to the at least two non-reference skeleton poses are determined.

The operation of generating a target skeleton shape model of the target skeleton pose based on the obtained non-reference skeleton shape model of the non-reference skeleton pose includes:

determining, for any obtained non-reference skeleton pose, a vector distance between the obtained non-reference skeleton pose and the target skeleton pose, the skeleton pose being a 3D mathematical vector;

transforming, based on a respective target radial function of a radial basis function (RBF), the respective vector distances corresponding to the obtained non-reference skeleton poses to a radial function space respectively;

performing linear mapping on each vector distance in the radial function space, and determining a weight of the obtained non-reference skeleton pose corresponding to the each vector distance; and calculating a weighted sum of corresponding non-reference skeleton shape models according to the weights of the obtained non-reference skeleton poses, and generating the target skeleton shape model of the target skeleton pose.

A function value of the target radial function is proportional to a square of the vector distance and proportional to a logarithm of the vector distance, as shown in the following formula:

$$f(d) = d^2 \times \log\frac{d}{k}$$

where d is the vector distance and k is a constant. In some embodiments, d is the vector distance and k is a constant for a respective non-reference skeleton pose.

In an example implementation, the target radial function may also be determined by a function selection instruction. In this case, at least two radial functions need to be displayed in the display interface. FIG. 9 shows a display interface of determining a target radial function. The display interface includes at least one of the following radial functions:

linear function: $Ff(d) = kd$

Gaussian function: $Gf(d) = \frac{1}{2\pi v}e^{-d^2/(2v)}\frac{1}{2\pi k}e^{-d^2/(2k)}$ special radial function, also known as Thin–Plate function:

$$f(d) = d^2 \times \log\frac{d}{k},$$

where d is the vector distance and k is a constant.

Figure 10:
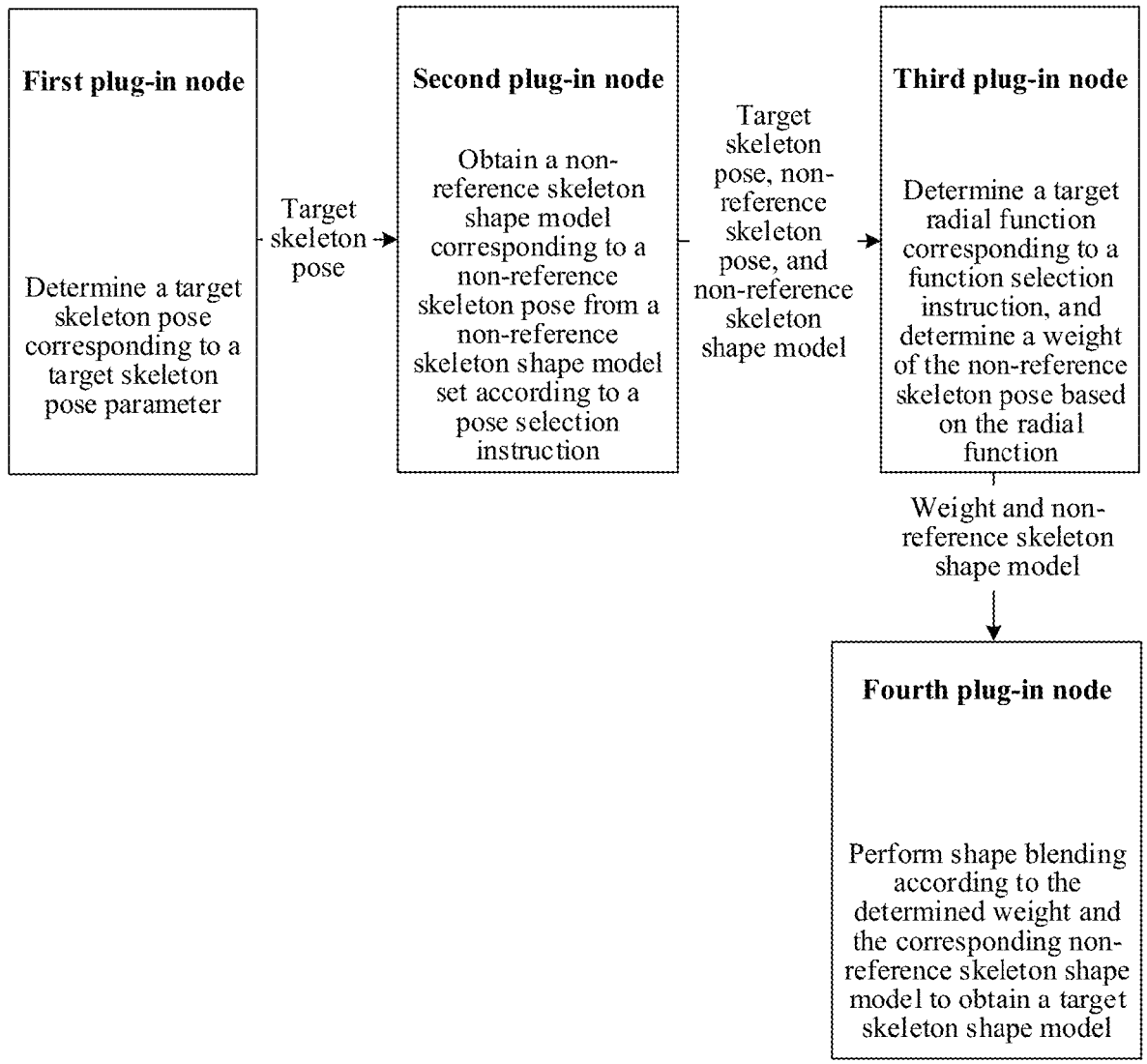
FIG. 10 is a flowchart of animation making using plug-in nodes according to an embodiment of the present disclosure.

In an example implementation, the animation making method can be implemented by a plurality of plug-in nodes, and one plug-in node implements a plurality of functional operations in animation making. FIG. 10 is a flowchart of animation making using plug-in nodes according to an embodiment of the present disclosure. As can be seen from FIG. 10, during animation making, four plug-in nodes can be used to implement a PoseDriver process in a production process.

First Plug-In Node:

When an animated character needs to be made, a parameter input for a target skeleton pose parameter of the animated character is determined. The first plug-in node is invoked. The first plug-in node determines a target skeleton pose corresponding to the target skeleton pose parameter, and inputs the target skeleton pose to a second plug-in node.

Second Plug-In Node:

A non-reference skeleton pose to be used in generating a target skeleton shape model is determined. In response to a pose selection instruction for the non-reference skeleton pose, the second plug-in node is invoked. The second plug-in node obtains, according to the pose selection instruction, a non-reference skeleton shape model corresponding to the non-reference skeleton pose from the non-reference skeleton shape model set, and inputs the determined non-reference skeleton pose and the corresponding non-reference skeleton shape model, as well as the target skeleton pose into a third plug-in node.

The second plug-in node is the target plug-in node according to the embodiments of the present disclosure.

In an example implementation, the second plug-in node may further perform the following functions:

determining, according to the target skeleton pose and the non-reference skeleton pose, a vector distance between the non-reference skeleton pose and the target skeleton pose, where the skeleton pose is a standard 3D mathematical vector, and therefore the vector distance between the non-reference skeleton pose and the target skeleton pose can be determined by using a vector distance calculation formula; and inputting the vector distance and the non-reference skeleton shape model into the third plug-in node.

Third Plug-In Node:

A target radial function to be used for generating a target skeleton shape model of a target skeleton pose based on the non-reference skeleton shape model of the obtained non-reference skeleton pose is determined, and in response to a function selection instruction, the third plug-in node is invoked to determine the target radial function corresponding to the function selection instruction. Based on the non-reference skeleton pose and the target skeleton pose determined by the second plug-in node, the third plug-in node determines a vector distance between the non-reference skeleton pose and the target skeleton pose, then maps the vector distance to a radial function space based on the target radial function, performs linear mapping in the radial function space, determines a weight of the non-reference skeleton pose corresponding to the vector distance, and inputs the determined weight and the non-reference skeleton shape model into a fourth plug-in node.

In an example implementation, if the second plug-in node inputs the vector distance and the non-reference skeleton shape model, the vector distance is directly mapped to the radial function space based on the target radial function. Then linear mapping is performed in the radial function space, the weight of the non-reference skeleton pose corresponding to the vector distance is determined, and the determined weight and the non-reference skeleton shape model are inputted into the fourth plug-in node.

Fourth Plug-In Node:

The fourth node receives the weight, and performs shape blending according to the weight of each non-reference skeleton pose and each non-reference skeleton shape model to obtain the target skeleton shape model.

Figure 11:
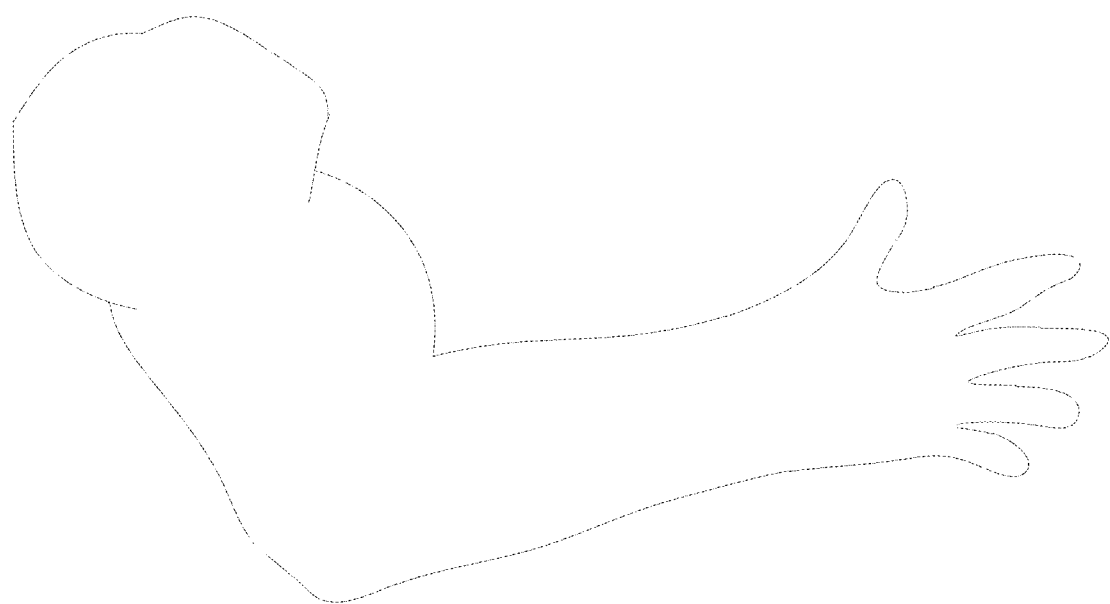
FIG. 11 is a schematic diagram of a target skeleton shape model generated based on a non-reference skeleton shape model according to an embodiment of the present disclosure.

FIG. 11 is a schematic diagram of a target skeleton shape model generated based on a non-reference skeleton shape model of an obtained non-reference skeleton pose by using the animation making method according to an embodiment of the present disclosure.

In the animation making method according to the embodiments of the present disclosure, a non-reference skeleton pose of a skeleton shape model for make animation is selected from a plug-in node, which can improve the flexibility in a process of making an animated character, and unselected non-reference skeleton poses will not be deleted and thus do not need to be remade, thereby reducing the amount of calculation and improving execution efficiency.

Although the operations are displayed sequentially according to the instructions of the arrows in the flowcharts of the embodiments, these operations are not necessarily performed sequentially according to the sequence instructed by the arrows. Unless otherwise explicitly specified in the present disclosure, execution of the operations is not strictly limited, and the operations may be performed in other sequences. Moreover, at least some of the operations in each embodiment may include a plurality of sub-operations or a plurality of stages. The sub-operations or stages are not necessarily performed at the same moment but may be performed at different moments. Execution of the sub-operations or stages is not necessarily sequentially performed, but may be performed alternately with other operations or at least some of sub-operations or stages of other operations.

Figure 12:
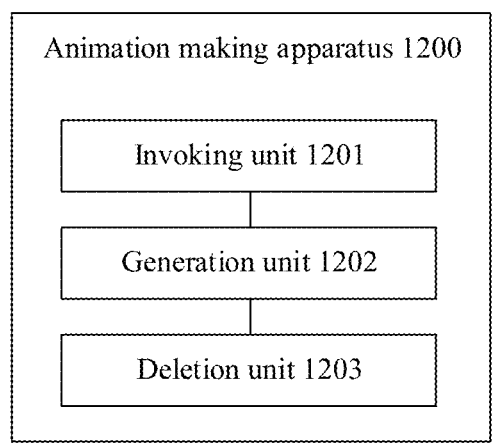
FIG. 12 is a structural diagram of an animation making apparatus according to an embodiment of the present disclosure.

Based on the same inventive concept, an embodiment of the present disclosure further provides an animation making apparatus 1200 for making an animated character. As shown in FIG. 12, the animation making apparatus 1200 apparatus 1200 includes: an invoking unit 1201 and a generation unit 1202.

The invoking unit 1201 is configured to invoke a target plug-in node in response to a pose selection instruction for a non-reference skeleton pose, and obtain a non-reference skeleton shape model corresponding to the non-reference skeleton pose from a non-reference skeleton shape model set according to the pose selection instruction, where the non-reference skeleton shape model set includes non-reference skeleton shape models corresponding to non-reference skeleton poses.

The generation unit 1202 is configured to determine a target skeleton pose according to a parameter input instruction for a target skeleton pose parameter of an animated character, and generate, based on the obtained non-reference skeleton shape model of the non-reference skeleton pose, a target skeleton shape model of the target skeleton pose.

In an example implementation, the invoking unit 1201 is specifically configured to:

obtain, when the pose selection instruction is used for instructing to disable a skeleton pose, a non-reference skeleton shape model corresponding to an unselected non-reference skeleton pose from the non-reference skeleton shape model set; and obtain, when the pose selection instruction is used for instructing to enable a skeleton pose, a non-reference skeleton shape model corresponding to a selected non-reference skeleton pose from the non-reference skeleton shape model set.

In an example implementation, the apparatus further includes: a deletion unit 1203;

the deletion unit is configured to delete, in response to a pose deletion instruction, a non-reference skeleton shape model corresponding to the pose deletion instruction.

In an example implementation, the generation unit 1202 is specifically configured to:

determine, for any obtained non-reference skeleton pose, a vector distance between the non-reference skeleton pose and the target skeleton pose, the skeleton pose being a 3D mathematical vector;

transform, based on a target radial function of a radial basis function (RBF), the vector distances corresponding to the obtained non-reference skeleton poses to a radial function space respectively;

perform linear mapping on each vector distance in the radial function space, and determine a weight of the non-reference skeleton pose corresponding to the each vector distance;

and calculate a weighted sum of the corresponding non-reference skeleton shape models according to the weights of the obtained non-reference skeleton poses, and generate the target skeleton shape model of the target skeleton pose.

In an example implementation, the generation unit 1202 is further configured to:

select, according to a function selection instruction, the target radial function from preset radial functions; a function value of the target radial function being proportional to a square of the vector distance and being proportional to a logarithm of the vector distance.

In an example implementation, the generation unit 1202 is further configured to:

store the shape model of the target skeleton pose as a non-reference skeleton shape model into the non-reference skeleton shape model set.

For ease of description, some components in the present disclosure are respectively described as various units (or modules) divided according to functions. During implementation of the present disclosure, the function of the units (or modules) may be implemented in the same piece of or multiple pieces of software, code, or hardware.

After the method and apparatus for making an animated character of the exemplary embodiments of the present disclosure are described, the following describes a computing device for making an animated character according to another exemplary embodiment of the present disclosure.

A person skilled in the art can understand that various aspects of the present disclosure may be implemented as systems, methods, or program products. Therefore, each aspect of the present disclosure may be specifically implemented in the following forms, that is, the implementation form of complete hardware, complete software (including firmware and micro code), or a combination of hardware and software, which may be uniformly referred to as "circuit", "module", or "system" herein.

In an example implementation, the computing device for animation making according to the embodiments of the present disclosure includes a memory and a processor, where the memory stores a computer-readable instruction. When the computer-readable instruction is executed by the processor, the processor executes any operation in the animation making method in various exemplary embodiments of the present disclosure.

A computing device 1300 for making an animated character according to this implementation of the present disclosure is described below with reference to FIG. 13. The computing device 1300 for animation making in FIG. 13 is merely an example, and does not impose any restriction on functions and scopes of use of the embodiments of the present disclosure.

Figure 13:
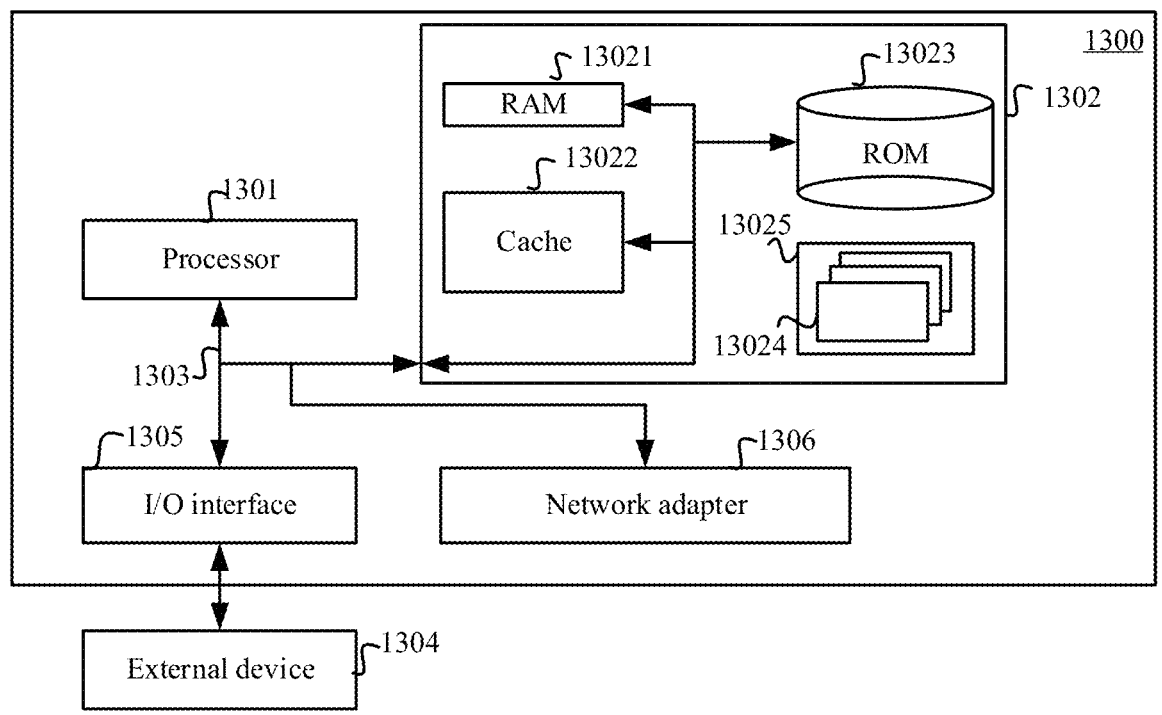
FIG. 13 is a structural diagram of a computing device for making animation according to an embodiment of the present disclosure.

As shown in FIG. 13, components of the computing device 1300 for making an animation or an animated character may include, but are not limited to: the at least one processor 1301, the at least one memory 1302, a bus 1303 connecting different system components (including the memory 1302 and the processor 1301).

The bus 1303 represents one or more of several types of bus structures, including a memory bus or a memory controller, a peripheral bus, a processor, or a local bus using any bus structure among various bus structures.

The memory 1302 may include a readable medium in a form a volatile memory, such as a random access memory (RAM) 13021 and/or a cache memory 13022, and may further include a read-only memory (ROM) 13023.

The memory 1302 may further include a program/utility 13025 having a set of (at least one) program modules 13024. Such program modules 13024 include, but are not limited to an operating system, one or more application programs, another program module, and program data. Each of such examples or a combination thereof may include an implementation of a network environment.

The computing device of 1300 for making an animation or animated character may alternatively communicate with one or more external devices 1304 (such as a keyboard, a pointing device, and the like), may alternatively communicate with a plurality of devices that enable a user to interact with the computing device 1300 for making an animation or animated character, and/or communicate with any device (such as a router or a modem) that enables the computing device 1300 for making an animated character to communicate with one or more other computing apparatuses. The communication may proceed through an input/output (I/O) interface 1305. In addition, the computing device 1300 for making an animation or animated character may further communicate with one or more networks (for example, a local area network (LAN), a wide area network (WAN), and/or a public network, such as Internet) by using a network interface controller 1306. As shown in FIG. 13, the network adapter 1306 communicates with other modules through the bus 1303 and the computing device 1300 for making an animated character. Although not shown in FIG. 13, other hardware and/or software modules may be used in combination with the computing device 1300 for making an animation or animated character, including, but not limited to: micro code, a device driver, a redundancy processor, an external disk drive array, a RAID system, a tape drive, a data backup storage system, and the like.

Another embodiment, for example, a non-volatile or non-transitory computer-readable storage medium storing a computer-readable instruction is provided. When being executed by one or more processors, the computer-readable instruction enables the one or more processors to perform operations in the animation making method in any of the above-mentioned embodiments. In some possible implementations, the aspects of the method for making an animated character provided in the present disclosure may be further implemented in a form of a program product, including program code. When the program product is run on a computing device, the program code is used for causing the computing device to perform the operations in the method for making an animated character according to various exemplary implementations of the present disclosure.

The program product may use any combination of one or more readable media. The readable medium may be a computer-readable signal medium or a computer-readable storage medium. The readable storage medium may be, for example, but is not limited to, an electric, magnetic, optical, electromagnetic, infrared, or semi-conductive system, apparatus, or component, or any combination thereof. More specific examples of the readable storage medium (a non-exhaustive list) include: an electrical connection having one or more wires, a portable disk, a hard disk, a RAM, a ROM, an erasable programmable ROM (EPROM or a flash memory), an optical fiber, a compact disc ROM (CD-ROM), an optical storage device, a magnetic storage device, or any appropriate combination thereof.

The program product generated for making an animated character according to an implementation of the present disclosure may use a CD-ROM, include program code, and may be run on the computing device. However, the program product of the present disclosure is not limited to this. In this specification, the readable storage medium may be any tangible medium including or storing a program, and the program may be used by or in combination with an instruction execution system, apparatus, or device.

The readable signal medium may include a data signal propagated in a baseband or as part of a carrier, and stores computer-readable program code. A data signal propagated in such a way may assume a plurality of forms, including, but not limited to, an electromagnetic signal, an optical signal, or any appropriate combination thereof. The readable signal medium may alternatively be any readable medium other than the readable storage medium. The readable medium may be configured to send, propagate, or transmit a program configured to be used by or in combination with an instruction execution system, apparatus, or device.

The program code included in the readable storage medium may be transmitted by using any suitable medium, including but not limited to a wireless medium, a wired medium, an optical cable, RF, or any appropriate combination thereof.

The program code used for executing the operations of the present disclosure may be written by using one or more programming languages or a combination thereof. The programming languages include an object-oriented programming language such as Java, C++ and the like, and also include a conventional procedural programming language such as "C" or similar programming languages. The program code may be completely executed on a user computing apparatus, partially executed on user equipment, executed as an independent software package, partially executed on a user computing apparatus and partially executed on a remote computing apparatus, or completely executed on a remote computing apparatus or server. For the case involving a remote computing apparatus, the remote computing apparatus may be connected to a computing apparatus of a user through any type of network including a LAN or a WAN, or may be connected to an external computing apparatus (for example, through the Internet by using an Internet service provider).

Although several units or subunits of the apparatus are mentioned in detailed description above, such division is merely an example but not mandatory. In fact, according to the implementations of the present disclosure, features and functions of two or more units described above may be specified in one unit. On the contrary, the features or functions of one unit described above may further be divided and specified by a plurality of units.

In addition, although the operations of the method in the present disclosure are described in a non-reference order in the accompanying drawings. This does not require or imply that the operations have to be performed in the non-reference order, or all the operations shown have to be performed to achieve an expected result. Additionally or alternatively, some operations may be omitted, and a plurality of operations are combined into one operation to be performed, and/or one operation is divided into a plurality of operations to be performed.

A person skilled in the art can understand that the embodiments of the present disclosure may be provided as a method, a system, or a computer program product. Therefore, the present disclosure may use a form of hardware-only embodiments, software-only embodiments, or embodiments combining software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to flowcharts and/or block diagrams of the method, the device (system), and the computer program product according to the embodiments of the present disclosure. Computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer-readable memory that can guide a computer or another programmable data processing device to work in a non-reference manner, so that the instructions stored in the computer-readable memory generate a product including an instruction apparatus, where the instruction apparatus implements functions specified in one or more procedures in the flowcharts and/or one or more blocks in the block diagrams.

The computer program instructions may also be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Although preferable embodiments of the present disclosure have been described, once persons skilled in the technology know a basic creative concept, they can make other changes and modifications to these embodiments. Therefore, the following claims are intended to be construed as to cover the exemplary embodiments and all changes and modifications falling within the scope of the present disclosure.

Obviously, a person skilled in the art can make various modifications and variations to the present disclosure without departing from the spirit and scope of the present disclosure. In this case, if the modifications and variations made to the present disclosure fall within the scope of the claims of the present disclosure and their equivalent technologies, the present disclosure is intended to include these modifications and variations.

What is claimed is:

1. An animation making method, performed by a computing device, the method comprising:
   in response to a pose selection instruction for a non-reference skeleton pose, obtaining, through a first function and from a non-reference shape model set, a non-reference skeleton shape model corresponding to the non-reference skeleton pose, the non-reference skeleton shape model being a muscle shape for an animated character corresponding to the non-reference skeleton pose;
   obtaining at least two non-reference skeleton poses based on a target skeleton pose of the animated character;
   determining a weighted sum of at least two non-reference skeleton shape models corresponding to the at least two non-reference skeleton poses based on respective vector distance of the at least two non-reference skeleton poses; and
   generating a target skeleton shape model of the target skeleton pose based on the weighted sum of the at least two non-reference skeleton shape models.

2. The method according to claim 1, wherein the obtaining comprises:
   obtaining, based on the pose selection instruction being used for instructing to disable a skeleton pose, a non-reference skeleton shape model corresponding to an unselected non-reference skeleton pose from the non-reference skeleton shape model set; or
   obtaining, based on the pose selection instruction being used for instructing to enable a skeleton pose, a non-reference skeleton shape model corresponding to a selected non-reference skeleton pose from the non-reference skeleton shape model set.

3. The method according to claim 1, wherein the method further comprises:
   deleting, in response to a pose deletion instruction, a non-reference skeleton shape model corresponding to the pose deletion instruction.

4. The method according to claim 1, wherein after the generating the target skeleton shape model of the target skeleton pose, the method further comprises:

storing the target skeleton shape model of the target skeleton pose as another non-reference skeleton shape model into the non-reference skeleton shape model set.

5. The method according to claim 1, wherein the generating the target skeleton shape model of the target skeleton pose comprises:
   determining, for each of the at least two obtained non-reference skeleton poses, the respective vector distance between the obtained non-reference skeleton pose and the target skeleton pose, a skeleton pose being a three-dimensional (3D) mathematical vector;
   transforming, based on a respective target radial function of a radial basis function (RBF), the respective vector distances corresponding to the obtained non-reference skeleton poses to a radial function space;
   performing linear mapping on each vector distance in the radial function space, and determining a weight of the obtained non-reference skeleton poses corresponding to each vector distance among the respective vector distance; and
   calculating the weighted sum of corresponding non-reference skeleton shape models according to weights of the obtained non-reference skeleton poses, and generating the target skeleton shape model of the target skeleton pose.

6. The method according to claim 5, wherein the method further comprises:
   selecting the respective target radial function from preset radial functions in response to a function selection instruction, a function value of the respective target radial function being proportional to a square of the respective vector distance and being proportional to a logarithm of the respective vector distance.

7. An animation making apparatus, comprising:
   at least one memory configured to store program code; and
   at least one processor configured to read the program code and operate as instructed by the program code, the program code comprising:
      invoking code configured to cause the at least one processor to, in response to a pose selection instruction for a non-reference skeleton pose, obtain, through a first function and from a non-reference shape model set, a non-reference skeleton shape model corresponding to the non-reference skeleton pose, the non-reference skeleton shape model being a muscle shape for an animated character corresponding to the non-reference skeleton pose;
      first determining code configured to cause the at least one processor to obtain at least two non-reference skeleton poses based on a target skeleton pose of the animated character;
      second determining code configured to cause the at least one processor to determine a weighted sum of at least two non-reference skeleton shape models corresponding to the at least two non-reference skeleton poses based on respective vector distance of the at least two non-reference skeleton poses; and
      generating code configured to cause the at least one processor to generate a target skeleton shape model of the target skeleton pose based on the weighted sum of the at least two non-reference skeleton shape models.

8. The apparatus according to claim 7, wherein the invoking code is further configured to cause the at least one processor to:
   obtain, based on the pose selection instruction being used for instructing to disable a skeleton pose, a non-reference skeleton shape model corresponding to an unselected non-reference skeleton pose from the non-reference skeleton shape model set; and
   obtain, based on the pose selection instruction being used for instructing to enable a skeleton pose, the non-reference skeleton shape model corresponding to a selected non-reference skeleton pose from the non-reference skeleton shape model set.

9. The apparatus according to claim 7, wherein the program code further comprises:
   deleting code configured to cause the at least one processor to delete, in response to a pose deletion instruction, a non-reference skeleton shape model corresponding to the pose deletion instruction.

10. The apparatus according to claim 7, wherein the generating code is further configured to cause the at least one processor to:
   store the target skeleton shape model of the target skeleton pose as another non-reference skeleton shape model into the non-reference skeleton shape model set.

11. The apparatus according to claim 7, wherein the generating code is further configured to cause the at least one processor to:
   determine, for each of the at least two obtained non-reference skeleton poses, the respective vector distance between the obtained non-reference skeleton poses and the target skeleton pose, a skeleton pose being a three-dimensional (3D) mathematical vector;
   transform, based on a respective target radial function of a radial basis function (RBF), the respective vector distances corresponding to the obtained non-reference skeleton poses to a radial function space;
   perform linear mapping on each vector distance in the radial function space, and determine a weight of the obtained non-reference skeleton poses corresponding to each vector distance among the respective vector distance; and
   calculate che weighted sum of corresponding non-reference skeleton shape models according to weights of the obtained non-reference skeleton poses, and generate the target skeleton shape model of the target skeleton pose.

12. The apparatus according to claim 11, wherein the generating code is further configured to cause the at least one processor to:
   select, according to a function selection instruction, the respective target radial function from preset radial functions, a function value of the respective target radial function being proportional to a square of the respective vector distance and being proportional to a logarithm of the respective vector distance.

13. A non-transitory computer-readable storage medium, storing at least one instruction executable by at least one processor to perform:
   in response to a pose selection instruction for a non-reference skeleton pose, obtaining, through a first function and from a non-reference shape model set, a non-reference skeleton shape model corresponding to the non-reference skeleton pose, the non-reference skeleton shape model being a muscle shape for an animated character corresponding to the non-reference skeleton pose;
   obtaining at least two non-reference skeleton poses based on a target skeleton pose of the animated character;

determining a weighted sum of at least two non-reference skeleton shape models corresponding to the at least two non-reference skeleton poses based on respective vector distance of the at least two non-reference skeleton poses; and generating a target skeleton shape model of the target skeleton pose based on the weighted sum of the at least two non-reference skeleton shape models.

14. The non-transitory computer-readable medium of claim 13, wherein the invoking comprises:

obtaining, based on the pose selection instruction being used for instructing to disable a skeleton pose, a non-reference skeleton shape model corresponding to an unselected non-reference skeleton pose from the non-reference skeleton shape model set;

obtaining, based on the pose selection instruction being used for instructing to enable a skeleton pose, a non-reference skeleton shape model corresponding to a selected non-reference skeleton pose from the non-reference skeleton shape model set.

15. The non-transitory computer-readable medium of claim 13, wherein the at least one instruction is executable by the at least one processor to further perform:

deleting, in response to a pose deletion instruction, a non-reference skeleton shape model corresponding to the pose deletion instruction.

16. The non-transitory computer-readable medium of claim 13, wherein after the generating the target skeleton shape model of the target skeleton pose, the at least one instruction is executable by the at least one processor to further perform:

storing the target skeleton shape model of the target skeleton pose as another non-reference skeleton shape model into the non-reference skeleton shape model set.

17. The non-transitory computer-readable medium of claim 13, wherein the generating the target skeleton shape model of the target skeleton pose comprises:

determining, for each of the at least two obtained non-reference skeleton poses, the respective vector distance between the obtained non-reference skeleton poses and the target skeleton pose, a skeleton pose being a three-dimensional (3D) mathematical vector;

transforming, based on a respective target radial function of a radial basis function (RBF), the respective vector distances corresponding to the obtained non-reference skeleton poses to a radial function space;

performing linear mapping on each vector distance in the radial function space, and determining a weight of the obtained non-reference skeleton poses corresponding to each vector distance among the respective vector distance; and calculating the weighted sum of corresponding non-reference skeleton shape models according to weights of the obtained non-reference skeleton poses, and generating the target skeleton shape model of the target skeleton pose.

18. The non-transitory computer-readable medium of claim 17, wherein the at least one instruction is executable by the at least one processor to further perform:

selecting the respective target radial function from preset radial functions in response to a function selection instruction, a function value of the respective target radial function being proportional to a square of the respective vector distance and being proportional to a logarithm of the respective vector distance.

* * * * *